United States Patent
Baruth et al.

[15] 3,649,974
[45] Mar. 21, 1972

[54] VEHICLE SEAT

[72] Inventors: Elmore J. Baruth; Robert M. Smaxwill, both of Milwaukee, Wis.

[73] Assignee: Universal Oil Products Company, Des Plaines, Ill.

[22] Filed: Dec. 15, 1969

[21] Appl. No.: 885,200

[52] U.S. Cl. ..................................5/345, 5/360, 297/458
[51] Int. Cl. ...........................................A47c 23/00
[58] Field of Search ................5/353.1, 353.2, 353.3, 353.7, 5/360, 356; 297/452, 458

[56] References Cited

UNITED STATES PATENTS

| | | | |
|---|---|---|---|
| 2,875,819 | 3/1959 | Hoag | 297/458 |
| 3,293,670 | 12/1966 | Anson | 5/345 |
| 3,363,943 | 1/1968 | Getz et al. | 297/452 |

*Primary Examiner*—Bobby R. Gay
*Assistant Examiner*—Garry Moore
*Attorney*—James R. Hoatson, Jr. and Philip T. Liggett

[57] ABSTRACT

In a vehicle seat, the improvement comprising a seat cover positioned on a contoured foam cushion, both being held together by means of upper and lower parallel wires fastened together along their lengths. The lower wire is embedded in the foam cushion parallel to and below the demarcation between the seating portion and bolster portions of the upper surface of the cushion. The upper wire is entrapped within a sleeve fastened to the underside of the seat cover and is generally parallel to the lower wire. The upper and lower wires are fastened together by fastening means which pierce the sleeve.

6 Claims, 5 Drawing Figures

PATENTED MAR 21 1972 3,649,974

INVENTORS:
Elmore J. Baruth
Robert M. Smaxwill
BY: James R. Hoatson, Jr.
Philip T. Liggett
ATTORNEYS

VEHICLE SEAT

This invention relates to a vehicle seat. More particularly, the invention is the improvement of a seat cover positioned on a contoured foam cushion, both held together by means of upper and lower parallel wires fastened together along their lengths. The lower wire is embedded in the foam cushion parallel to and below the demarcation between the seating portion and bolster portions of the upper surface of the cushion. An upper wire is entrapped within a sleeve fastened to the underside of the seat cover, and is generally parallel to the lower wire. The upper and lower wires are fastened together by fastening means which pierce the sleeve.

In the past, vehicle seat covers have been attached to seat cushions in a variety of ways. Many of the earlier ways were not adaptable for use in the solid foam cushions which are now widely used in vehicle seating. With the advent of solid foam cushions in vehicle seating, different methods of attaching a vehicle seat cover to a foam cushion were used. The simplest method is to cement the seat cover to the cushion. A seat so designed is not very durable, however, because the adhesive bond often breaks due to the repeated flexing of the seat cushion. In addition, seat covers are frequently made of polyvinyl chloride, which is readily attacked by most cements for joining polyvinyl chloride and conventional foam cushion materials. Another method of attachment used involves embedding a contoured wire below the surface in a foam cushion and attaching the seat cover to the cushion by using hog rings which pierce a listing or flap sewn to the underside of the seat cover and which pierce the seat cushion and encircle the embedded wire. The result is a seat cover attached to a solid foam cushion by hog rings in a pattern which conforms to the seat occupant's body. This pattern of attachment tends to contour the seat to accommodate the seat occupant or to enhance an already existing contour, but the contour created tends to have a poor definition. That is, the contour is quite pronounced above the points where the hog rings are fastened, but tends to become indistinct between the hog ringed locations of the seat covers, thereby giving a wavy appearance to the exposed surface of the seat cover.

Another manner of seat cover attachment is through the use of tie-downs. In this construction, wire clips or elastic bands are anchored to the seat cover and pass all the way through the foam cushion and are attached to the underside of the seat cushion or to a frame adjacent to the underside of the seat cushion. The assembly cost is the primary disadvantage with this manner of cover attachment. The special tools and extra parts required in assembling such a seat add further to the expense. Yet a further manner of attachment involves making slits in the foam cushion in a pattern which conforms to the contouring desired. Flaps of material are sewn to the underside of the seat cover and are inserted in the slits and glued in place. This manner of contouring works well at the sides of a seat cushion, but presents problems when an additional bolster at the front or rear of the seat cushion is desired. When the cushion is slit on more than two sides, it is difficult to correctly insert and glue the flaps to the seat cushion, and the extensive slitting seriously weakens the seat cushion so that subsequent tearing of the foam frequently occurs.

To maximize the beneficial features and to minimize the disadvantages of prior forms of seat cover attachment, the present invention was devised.

It is an object of this invention to fasten a seat cover to a foam cushion with a fastening means in a manner creating a uniform or well defined contour. The fastening means used in this invention is entirely internal and there are no protrusions at the bottom of the seat cushion such as occur when tiedown wires or bands are used.

It is another object to attach a seat cover to a contoured foam cushion so as to accentuate existing contouring. The use of an upper wire associated with the seat cover and a lower wire associated with the seat cushion, both shaped to conform to the human figure, serve to accentuate the contouring as well as enhance the uniformity and smoothness of the contouring.

It is another object to fasten a seat cover to a foam cushion rapidly and easily so as to reduce the cost of assembly. This is preferably accomplished using hog rings as the fastening means of this invention.

In a broad aspect this invention is, in a vehicle seat, the improvement comprising: a resilient foam seat cushion having an upper surface contoured generally into a seating portion and bolster portions along the boundary of said seating portion; a lower wire foamed into said seat cushion and running below said upper surface parallel to the boundary of said seating portion; a seat cover having an exposed surface and having an underside in contact with said upper cushion surface; a sleeve fastened to the underside of said seat cover to follow the boundary of said seating portion; an upper wire entrapped by said sleeve and generally parallel to said lower wire; and fastening means binding said lower and upper wires together along the length of said wires.

The foam used to construct the seat cushion may be any conventional foam material such as natural or synthetic rubber, flexible polyurethane foam, vinyl, or other resilient foam material. Both the upper and lower wires used may be constructed of any rigid material, but preferably are steel wires. Steel wires are economical and are flexible enough to readily conform to the movement of the foam during the cushioning action of the seat. The seat cover may be constructed of any conventional seat covering material, such as natural or synthetic fabrics, polyvinyl chloride, or other plastics.

Frequently the vehicle seat cover is comprised of a plurality of separate sections of joined covering material. A strip of flexible material is positioned near the underside of the seat cover to follow the boundary of the seating portion of the upper cushion surface. The edges of the strip are folded together to form a sleeve and are fastened to the seat cover. The sides of the strip of material and the separate sections of the covering material are fastened together along the boundary of the seating portion of the cushion. This manner of construction is easily accomplished by joining the material with thread or other convenient fastening means. In an alternative construction, the seat cover is comprised of a single expanse of seat covering material and a separate strip of flexible material may be positioned next to the underside of the seat cover to follow the boundary of the seating portion of the upper cushion surface. The edges of the strip are again folded together to form a sleeve and are fastened to the underside of the seat cover, usually by stitches of thread. In either of these constructions, the upper wire may be positioned in place while the sleeve is being formed or it may be inserted into the sleeve from either end after the sleeve is once constructed.

To eliminate the ridge which would otherwise be formed in the exterior surface of the seat cover by reason of the sleeve and upper wire positioned thereunder, there is a groove constructed in the upper surface of the seat cushion at the boundary of the seating portion in a preferred form of this invention. This groove delineates the upper surface of the seat cushion into the seating portion and the bolster portions. The groove accommodates the sleeve, thereby preventing the occurrence of a ridge in the exposed surface of the seat cover due to the sleeve and the upper wire encased therein.

While the fastening means used to secure the upper and lower wires together may be any conventional fastening means, such as stitches of thread passing around the upper and lower wires and through the foam and the sleeve, the fastening means are preferably hog rings. Hog rings may be quickly and easily inserted through the foam and the sleeve to encircle the upper and lower wires. The hog rings are inserted from above the cushion by holding back the edge of the seat cover over the seating portion of the upper cushion surface thereby exposing the sleeve at the boundary of the seating portion. A hog ring is used to fasten the upper and lower wires by forcing one prong of the hog ring through the sleeve. The other prong is passed around the lower wire so that the two prongs together bracket the upper and lower wires. If the sleeve is constructed with intermittent gaps along its length through which the upper wire is visible, the hog rings need not pierce the sleeve but merely pass through the gaps between the underside of the seat cover and the upper wire to encircle the upper and lower wires. The lower wire may either be foamed entirely into the cushion or the cushion may be formed so as to leave interstitial portions of the lower wire exposed. A conventional tool for clamping hog rings is used to apply pressure on the outside of the prongs of the hog ring thereby forcing the ends of the prongs inward to overlap and to encircle the upper and lower wires. The points of the ends of the prongs either project toward the cushion or are buried in the cushion. The edge of the seat cover is drawn over the bolster portions of the foam cushion to be fastened underneath the foam cushions and the hog rings are thereby invisible from above the exposed surface of the seat cover.

The various features of this invention are more clearly illustrated in the accompanying drawings in which.

Figure 1:
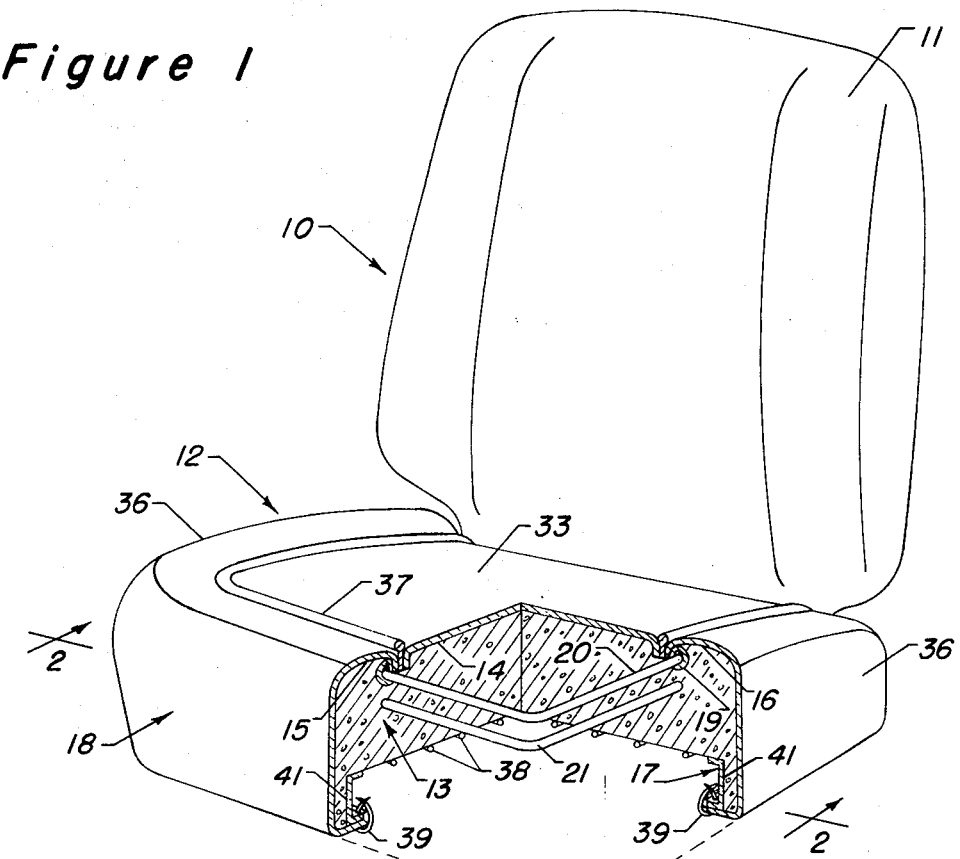
FIG. 1 is a partially broken away perspective view of a preferred embodiment of this invention.

Referring now to FIG. 1 there is shown a vehicle seat 10 comprised of a seat part 12 and a back part 11. Back part 11 may be of any conventional construction or may be of a construction similar to that of the seat part 12. The structural members of seat part 12 include a seat frame 17 molded into a flexible polyurethane foam seat cushion 13. Cushion 13 is covered by a plain fabric or coated fabric seat cover 18 which envelops the foam cushion 13 and is tautly fastened on the underside of the seat part 12 by hog rings 39 which pass through the edges of seat cover 18 and perforations in the lower part of channel 41 which is a part of frame 17. The seat cover 18 is comprised of a plurality of sections of joined covering material. Included in seat cover 18 are peripheral sections 36, and central section 33.

Seat cushion 13 is produced in a mold that is shaped to produce a contoured seat cushion. As can be seen, seat cushion 13 has a contoured upper surface. The contoured upper surface is divided into a central seating portion 14 along the boundary of which are side bolster portions 16 and 16' and front bolster portion 15. A central seating portion 14 is designed to accommodate the form of a person seated in seat 10 while bolster portions 16, 16', and 15 are designed to add to the comfort of a seated occupant and to centrally position the occupant within the seat.

Figure 4:
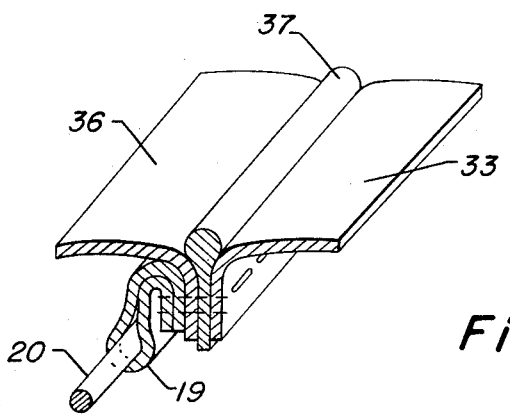
FIG. 4 is an isolated perspective view of the sleeve of the embodiment of FIG. 1.

A sleeve 19 is constructed to protrude from the underside of seat cover 18 and to follow the demarcation between the seating portion 14 and the various bolster portions of the upper surface of seat cushion 13 when the seat is assembled. The preferred manner of seat cover and sleeve construction is illustrated in FIG. 4. To construct the sleeve 19, the edges of a strip of flexible material are folded together to form sleeve 19. The edges of the peripheral sections 36 of the material from which seat cover 18 is to be formed are positioned against the central section 33 so that the surface of central section 33 to be exposed is face to face with the surfaces of peripheral sections 36 which are to be exposed. A decorative welting strip may or may not be sandwiched between the central section 33 and the peripheral sections 36. The decorative welting strip 37 is included in the illustrations of FIGS. 1, 2, and 4. The edges of all the adjacent materials are then aligned and sewn together and the peripheral sections 36 are then unfolded from the central section 33 of the seat cover 18 and are sewn together at their corners so as to form a contoured seat cover 18. Seat cover 18 is thereby formed with an exposed surface on one side and with sleeve 19 fastened to the underside. The upper wire 20 is then forced into the sleeve 19 and is shaped to conform to the sleeve 19, which in turn conforms to the boundary or demarcation between the central seating portion 14 and the bolster portions 16, 16', and 15 of seat cushion 13. The upper wire 20 is a steel wire shaped in the form of three sides of a rectangle. While the lower wire may be shaped in the form of a complete rectangle, lower wire 21 is shaped to form three sides of a rectangle with the missing side being at the rear of seat part 12.

Figure 2:
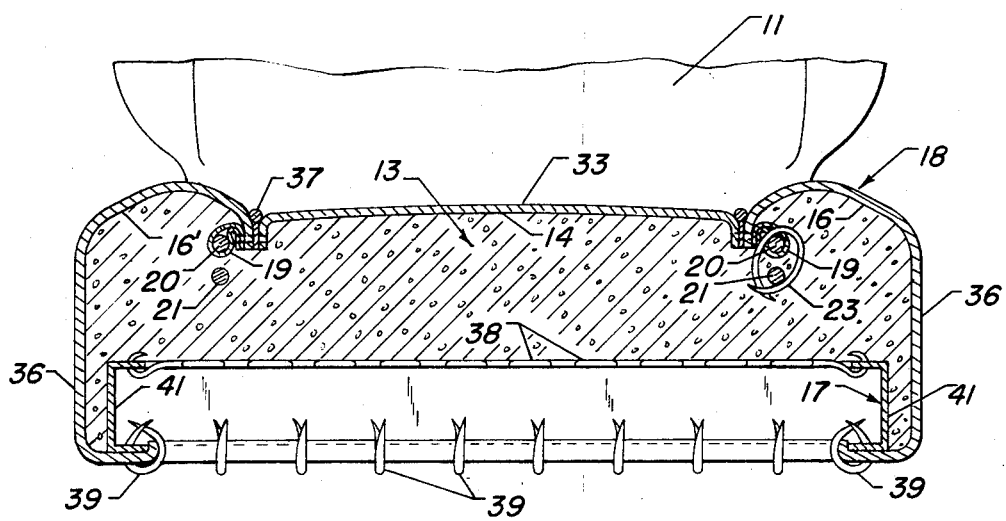
FIG. 2 is a sectional elevational view along the lines 2—2 of FIG. 1.
Figure 5:
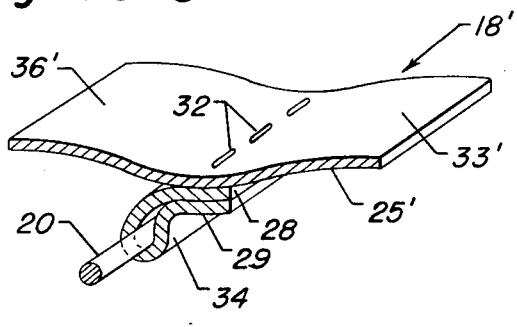
FIG. 5 is an isolated view of an alternative embodiment of the sleeve of this invention.

FIG. 5 illustrates an alternative embodiment of a sleeve which could have been used in place of the sleeve of FIGS. 1, 2, and 4. Referring now to FIG. 5, there is shown a strip of flexible material having edges 28 and 29 folded together to form a sleeve 34 positioned next to the underside 25' of a seat cover 18' having a central section 33' and peripheral sections 36'. This strip of material follows the boundary of the seating portion of the upper cushion surface when the seat cover 18' is in position. The edges 28 and 29 are sewn with thread to seat cover 18' and are thereby fastened to the underside 25' of seat cover 18' by stitches 32. Upper wire 20 is forced through the sleeve 34 to conform thereto. Sleeve 34 has essentially the same shape as does sleeve 19. Whatever the manner of sleeve construction, the assembly of the remaining portion of the seat part 12 is identical to that depicted in FIGS. 1 and 2.

Figure 3:
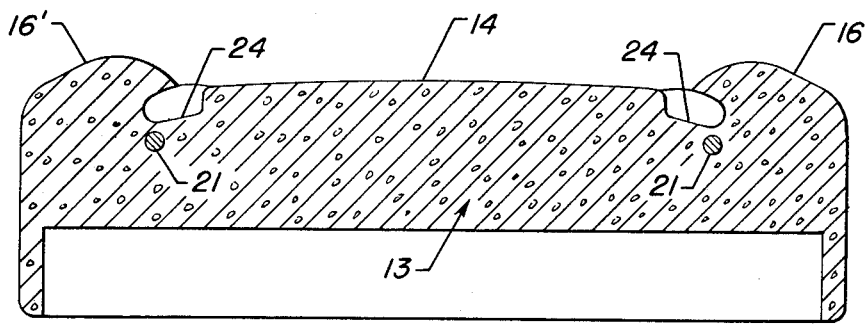
FIG. 3 is an isolated sectional elevational view of the foam seat cushion along the lines 2—2 of FIG. 1.

Seat cushion 13 is a polyurethane or other cellular foam seat cushion formed in a mold as previously described. A lower wire 21 and a seat frame 17 across which lateral springs 38 extend are positioned within the mold prior to introduction of the flexible foam formulation. Springs 38 are conventional flat wire springs having a series of alternate U-shaped configurations. The lower wire 21 is held raised within the mold by pedestals of polyurethane foam or other material such as metallic pins so that it will occupy the correct position within seat cushion 13. Once the polyurethane foam formulation is introduced into the mold and the mold is closed, the polyurethane formulation foams and incorporates the polyurethane pedestals into the flexible foam polyurethane cushion 13. If metallic pins are used in place of polyurethane pedestals, they are not incorporated into the foam cushion 13 but instead leave narrow channels extending into cushion 13 thereby exposing lower wire 21 at intermittent points prior to the installation of seat cover 18. Lower wire 21 is positioned within seat cushion 13 about one half an inch below the upper surface of cushion 13 and runs parallel to the boundary of seating portion 14. This means that when the seat cover 18 is in position, the upper wire 20 entrapped by sleeve 19 is generally parallel to the lower wire 21. The seat cushion 13 is molded with a groove 24 in the upper surface of the cushion 13 at the boundary of seating portion 14. Groove 24 is illustrated in FIG. 3, which shows an isolated view of the foam cushion of this invention. Groove 24 accommodates sleeve 19 and delineates the upper surface of cushion 13 into seating portion 14 and bolster portions 16, 15, and 16'. Sleeve 19 and the sewn edges of central section 33, peripheral sections 36, and welting strip 37 fit into groove 24 and run along the front and sides of seating portion 14 at the boundary between seating portion 14 and bolster portions 16, 15, and 16', but do not extend along the back edge of seat part 12. By accommodating sleeve 19, groove 24 prevents the occurrence of an uncomfortable ridge in the exposed surface of seat cover 18 due to sleeve 19 and upper wire 20 encased therein.

In assembling seat part 12, seat cover 18 is positioned with its central section 33 in contact with seating portion 14 of cushion 13. Sleeve 19, encompassing upper wire 20, is forced into groove 24. The peripheral sections 36 of seat cover 18 are folded back on top of the exposed surface of central section 33 of the seat cover 18, and hog rings 23 are used to attach the seat cover 18 to seat cushion 13. In FIG. 2, a sectional view of FIG. 1 is taken so as to expose a hog ring 23 which pierces sleeve 19 and cushion 13 and encircles upper wire 20 and lower wire 21. The hog ring 23 depicted is inserted and fastened by a conventional tool for such a purpose from above bolster portion 16. The prongs of hog ring 23 first pierce sleeve 19 and cushion 18 so as to bracket the wires 20 and 21. Pressure is then applied to the outsides of the prongs of hog ring 23 by the aforesaid tool, thereby causing the prongs of hog ring 23 to overlap and encircle the upper wire 20 and the lower wire 21. The insertion of other hog rings 23 is repeated intermittently along the lengths of wires 20 and 21. The seat cover 18 is thereby securely fastened to cushion 13 along the demarcation between the seating portion 14 and the bolster portions of the upper surface of the seat cushion 13. The peripheral sections 36 of seat cover 18 are then brought over and around the bolster portions 16, 16', and 15, to beneath the seat. Seat cover 18 is then hog ringed to the frame 17 in the standard manner. Frame 17 is comprised of a rigid channel 41 extending laterally around the seat beneath the bolster cushions and lateral springs 38 fastened to channel 41 in a conventional manner. Periodic perforations exist around the seat 12 in the lower portion of channel 41. Hog rings 39 are passed through these perforations in channel 41 and through the edges of the peripheral portions 36 of seat cover 18 to secure seat cover 18 to the frame 17. Once hog rings 39 are securely fastened, the construction of seat part 12 is complete.

The foregoing description and illustrations of the invention disclosed in this application are for purposes of illustration only, and no unnecessary limitations as to the scope of this invention should be construed therefrom as other modifications will be obvious to those skilled in the art of vehicle seating.

We claim as our invention:

1. In a vehicle seat, the improvement comprising:
   a. a resilient foam seat cushion having a lower and upper surface, said upper surface being contoured generally into a seating portion and bolster portions along the boundary of said seating portion,
   b. a lower wire foamed into said seat cushion and running below said upper surface and above said lower surface and disposed parallel to the boundary of said seating portion,
   c. a seat cover having an exposed surface and having an underside in contact with said upper cushion surface,
   d. a sleeve fastened to the underside of said seat cover to follow the boundary of said seating portion,
   e. an upper wire entrapped by said sleeve positioned in substantially vertical and parallel alignment with respect to said lower wire,
   f. spaced fastening means positioned under said upper surface and above said lower surface, said fastening means binding said lower and upper wires together along the lengths of said wires, whereby said sleeve and said upper and lower wires are secured in substantially vertical juxtaposed position and
   g. a groove in the upper surface of said cushion at the boundary of said seating portion delineating said upper surface into said seating portion and said bolster portions and accommodating said sleeve, thereby preventing the occurrence of a ridge in said exposed surface of said seat cover due to said sleeve and said upper wire.

2. The improved vehicle seat of claim 1 further characterized in that said seat cushion is constructed of flexible polyurethane foam.

3. The improved vehicle seat of claim 1 further characterized in that a strip of flexible material is positioned near the underside of said seat cover to follow the boundary of said seating portion of said upper cushion surface, and the edges of said strip are folded together to form a sleeve and are fastened to the underside of said seat cover.

4. The improved vehicle seat of claim 1 further characterized in that said seat cover is comprised of a single expanse of covering material.

5. The improved vehicle seat of claim 1 further characterized in that said seat cover is comprised of a plurality of separate sections of joined covering material.

6. The improved vehicle seat of claim 1 further characterized in that said fastening means are hog rings.

* * * * *